(12) United States Patent
Hornburg

(10) Patent No.: US 8,865,360 B2
(45) Date of Patent: Oct. 21, 2014

(54) FUEL CELL SYSTEM FOR A VEHICLE

(75) Inventor: Gerald Hornburg, Holzmaden (DE)

(73) Assignee: Daimler AG, Stuttgart (DE)

( * ) Notice: Subject to any disclaimer, the term of this patent is extended or adjusted under 35 U.S.C. 154(b) by 678 days.

(21) Appl. No.: 12/526,892

(22) PCT Filed: Feb. 1, 2008

(86) PCT No.: PCT/EP2008/000801
§ 371 (c)(1),
(2), (4) Date: Dec. 9, 2009

(87) PCT Pub. No.: WO2008/098687
PCT Pub. Date: Aug. 21, 2008

(65) Prior Publication Data
US 2010/0092822 A1    Apr. 15, 2010

(30) Foreign Application Priority Data

Feb. 13, 2007  (DE) .......................... 10 2007 006 963

(51) Int. Cl.
| | |
|---|---|
| H01M 8/04 | (2006.01) |
| B60H 1/14 | (2006.01) |
| B60H 1/03 | (2006.01) |
| H01M 8/10 | (2006.01) |

(52) U.S. Cl.
CPC .. *H01M 8/04022* (2013.01); *H01M 2008/1095* (2013.01); *H01M 8/04067* (2013.01); *H01M 2250/20* (2013.01); *B60H 1/143* (2013.01); *B60H 1/032* (2013.01); *Y02E 60/50* (2013.01); *Y02T 90/32* (2013.01)
USPC ........... 429/434; 429/435; 429/436; 429/437; 429/440; 429/441

(58) Field of Classification Search
USPC .......................... 429/436, 437, 438, 440, 441
See application file for complete search history.

(56) References Cited

U.S. PATENT DOCUMENTS

| | | | |
|---|---|---|---|
| 2003/0035988 A1* | 2/2003 | Graage | 429/26 |
| 2004/0197617 A1* | 10/2004 | Kaupert et al. | 429/19 |
| 2004/0209135 A1* | 10/2004 | Wexel et al. | 429/26 |
| 2005/0039959 A1 | 2/2005 | Fruhauf et al. | |
| 2006/0112695 A1 | 6/2006 | Neubauer et al. | |

FOREIGN PATENT DOCUMENTS

| | | |
|---|---|---|
| DE | 102 01 741 A1 | 8/2003 |
| DE | 103 01 609 A1 | 7/2004 |
| DE | 103 15 255 A1 | 10/2004 |
| DE | 103 24 213 A1 | 12/2004 |
| DE | 102 39 111 B4 | 4/2006 |

OTHER PUBLICATIONS

International Search Report dated May 19, 2008 (Four (4) pages).
Written Opinion of the International Searching Authority (Form PCT/ISA/220 and Form PCT/ISA/237) dated May 19, 2008 (Eight (8) pages).
German-language Office Action dated Sep. 20, 2013 (5 pages).

* cited by examiner

*Primary Examiner* — Jane Rhee
(74) *Attorney, Agent, or Firm* — Crowell & Moring LLP

(57) ABSTRACT

A fuel cell system for a vehicle includes a burner for producing a heat flow by combustion of a fuel gas which reacts with an oxidant. A heating heat exchanger provided to heat a vehicle passenger compartment is arranged in a coolant circuit of the fuel cell system, and is externally heated, at least at times, by the burner.

19 Claims, 3 Drawing Sheets

FUEL CELL SYSTEM FOR A VEHICLE

This application is a national stage of PCT International Application No. PCT/EP2008/000801, filed Feb. 1, 2008 and claims priority under 35 U.S.C. §119 to German Patent Application No. 10 2007 006963.6, filed Feb. 13, 2007, the entire disclosure of which is herein expressly incorporated by reference.

BACKGROUND AND SUMMARY OF THE INVENTION

The invention relates to a vehicle fuel cell system having a burner for producing a heat flow by combustion of a fuel gas which reacts with an oxidant.

In vehicles which are equipped with conventional internal combustion engines, the passenger compartment of the vehicle is generally heated by waste heat from a coolant circuit that cools the internal combustion engine. In particular, the passenger compartment of the vehicle is actually heated by a heating heat exchanger which is arranged in the coolant circuit. This arrangement has the disadvantage, however, that the coolant circuit heats up only comparatively slowly after the internal combustion engine is started, and rapid heating of the passenger compartment of the vehicle, as is desirable in particular in winter temperature conditions, is not possible.

Further problems result with drive concepts based on the use of fuel cells. For example, when the outside temperatures are below 0° C., it is possible for the process water in the fuel cell to freeze, impeding the gas-diffusion processes required within the fuel cell in order to generate electricity. In this case, cold starting of the fuel cell system is feasible only in a restricted form.

In this context, German patent document 103 24 213 A1 discloses a fuel cell system in which a hydrogen burner produces a heat flow that is used to preheat a fuel cell, by an exothermic reaction of hydrogen with air oxygen. According to one described embodiment of the fuel cell system, the heat flow that is produced is also used to heat the passenger compartment of the vehicle. No provision is made to use the process heat that is created during operation of the fuel cell system.

One object of the present invention therefore is to improve the efficiency both for preheating of the fuel cell system and for heating of the passenger compartment of the vehicle.

This and other objects and advantages are achieved by the fuel cell system according to the invention, which includes, in addition to a conventional fuel cell, a separate burner that produces a heat flow by combustion of a fuel gas which reacts with an oxidant. The heat flow is used to preheat the fuel cell and to heat the passenger compartment of the vehicle. According to the invention, a heating heat exchanger in the form of a radiator or the like is provided in order to heat the passenger compartment of the vehicle; the heat exchanger is arranged in a coolant circuit for cooling the fuel cell, and is externally heated, at least at times, by means of the burner.

After starting up the fuel cell system, the external heating can be carried out at least until the coolant which is circulating in the coolant circuit has reached its normal operating temperature. The heating heat exchanger is then heated in the normal manner by use of the process heat created during operation of the fuel cell, which is dissipated via the coolant circuit.

The external heating of the heating heat exchanger makes it possible to operate the heating heat exchanger (and therefore, to heat the passenger compartment of the vehicle) independently of the instantaneous operating state of the fuel cell system. On the other hand, the fuel cell can be preheated, in the opposite direction, by the thermal coupling between the heating heat exchanger and the coolant circuit. This is particularly important, for cold starting of the fuel cell system when the outside temperatures are close to freezing point.

There are various options for external heating of the heating heat exchanger. For example, it is possible to arrange a heating heat exchanger in the coolant circuit of the fuel cell system downstream from the burner. The circulation of coolant in the coolant circuit transports at least some of the combustion heat produced by the burner from the heat exchanger to the heating heat exchanger.

Alternatively, the burner can be followed by a heat exchanger which is connected to the heating heat exchanger either directly or else via its own coolant circuit. In this case, the heating heat exchanger can be heated independently of the operation of the fuel cell or of the coolant circuit associated with the fuel cell.

In order to provide such "stationary heating", the burner has its own associated oxidant and/or fuel gas supply.

In particular, the oxidant supply is a small electrical fan which is operated by means of a starter battery located in the vehicle. A reservoir is also provided for the fuel gas supply and is filled with fuel gas from a high-pressure tank or a reformer during operation of the fuel cell system, in order to allow continuous further supply of fuel gas to the burner once the fuel cell system has been switched off.

The fuel cells normally used in the motor vehicle field produce electrical power by electrochemical reaction of an oxygen-containing oxidant with a fuel gas containing hydrogen. This includes in particular fuel cells with a polymer membrane (polymer exchange membrane fuel cell or polymer electrolyte fuel cell) which are operated at comparatively low operating temperatures in the range from 70 to 200° C. In order to minimize the complexity, the burner also uses the same oxidant containing oxygen and/or the same gas containing hydrogen.

The oxidant is typically air taken from the atmosphere outside the vehicle, via an air filter system which has a silencer in addition to a mechanical and/or chemical particle filter. However, it is also feasible to supply the burner with the cathode off-gas (which contains oxygen and is created during operation of the fuel cell system) as the oxidant. In this case, there is no need for a separate oxidant supply, this can be provided exclusively for stationary heating purposes.

The burner itself may be either a catalytic burner or a flame or pore burner, which offers the advantage of particularly high heating power, while a catalytic burner is characterized by controlled combustion without any residue.

Other objects, advantages and novel features of the present invention will become apparent from the following detailed description of the invention when considered in conjunction with the accompanying drawings.

DETAILED DESCRIPTION OF THE DRAWINGS

Figure 1:
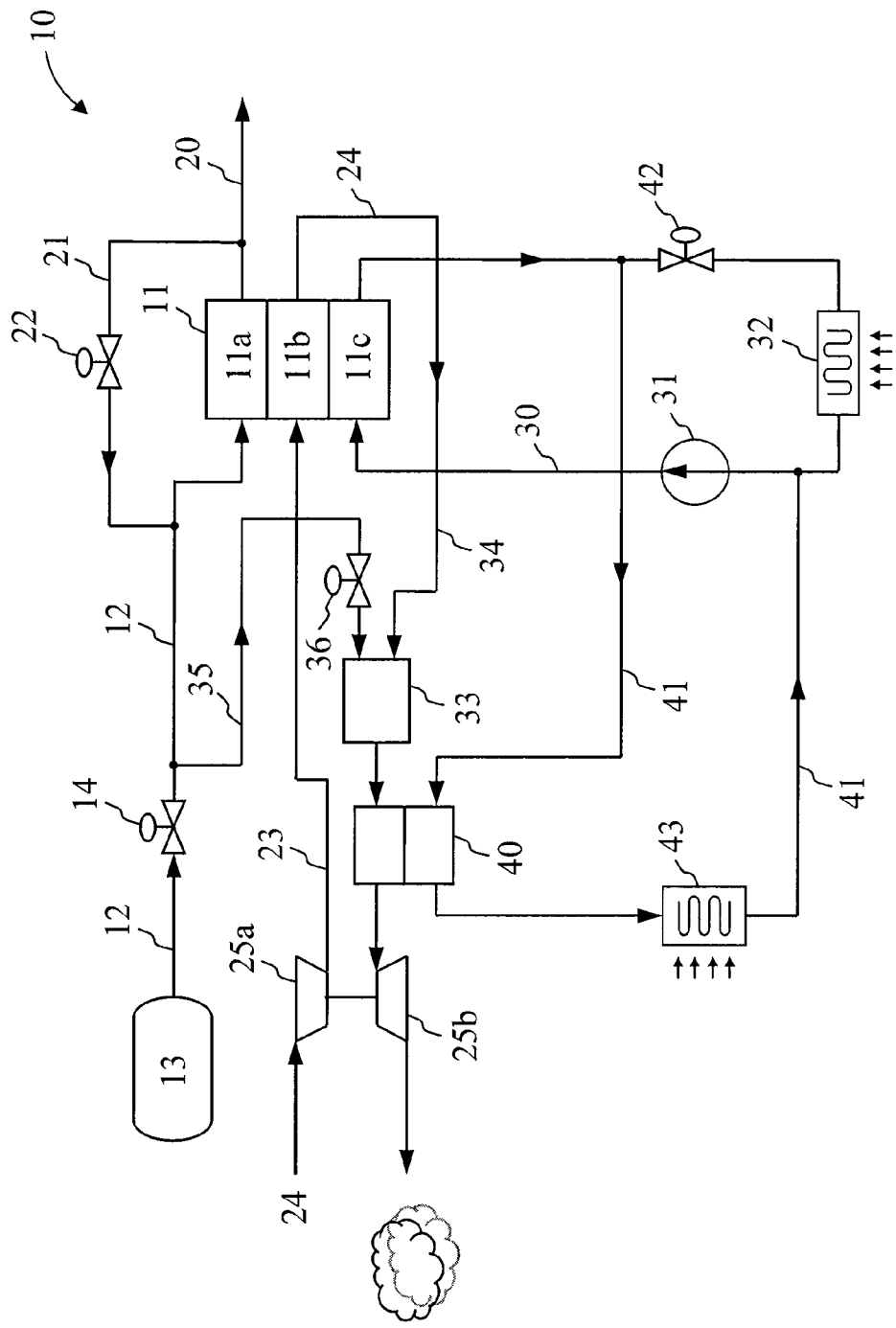
FIG. 1 shows a first exemplary embodiment of the fuel cell system according to the invention.

FIG. 1 shows a first exemplary embodiment of the vehicle fuel cell system 10, according to the invention, which has a fuel cell 11 that produces electrical power by electrochemical reaction of an oxidant with a fuel gas. In the present case, the fuel cell 11 is a so-called PEMC (polymer exchange membrane fuel cell) or a so-called PEFC (polymer electrolyte fuel cell). By way of example, it has an anode area 11a and a cathode area 11b, with the two areas being separated from one another by an electrolyte in the form of a polymer membrane. The polymer membrane is coated on both sides with a catalytically active electrode material, which is generally composed of graphite with admixtures of platinum and/or ruthenium.

In order to operate the fuel cell 11 a fuel gas 13, which is provided from a high-pressure tank or a reformer, and contains hydrogen, is supplied to the anode area 11a via a supply line 12. The fuel gas 13 containing hydrogen may be pure hydrogen gas. When the fuel cell system 10 is switched off, the supply line 12 is shut off by means of a solenoid valve 14, in order to prevent an undesirable release of hydrogen gas into the environment.

The anode off-gas created in the anode area 11a is either emitted directly into the environment via an off-gas line 20, or else at least part of it is supplied to the anode area 11a via an anode return line 21, which opens into the supply line 12 of the fuel cell 11. The amount of anode off-gas fed back can be controlled by means of an electrical throttle valve 22, which is arranged in the anode return line 21.

At the same time, the cathode area 11b is supplied via a feed line 23 with an oxidant 24 (a gas containing oxygen) in the form of compressed air. The air is taken from the atmosphere outside the vehicle by an air filter system and is in this case compressed by an electrically operated compressor 25a. In addition to a chemical and/or mechanical particle filter, the air filter system has, inter alia, a silencer in order to reduce the compressor noise.

A cooling device 11c for cooling the fuel cell 11 is connected to a coolant circuit 30, which has an electrically operated feed pump 31 that circulates a coolant therein. The process heat created in the operation of the fuel cell 11 is emitted to the environment via a radiator 32, which is likewise located within the coolant circuit 30.

The fuel cell system 10 has a separate burner 33 that is connected via a first supply line 34 to the cathode area 11b of the fuel cell 11 in order to supply the cathode off-gas (which contains oxygen and is created during operation of the fuel cell system 10) as oxidant. In addition, the burner 33 is also supplied via a second supply line 35 with fuel gas from the high-pressure tank or reformer of the fuel cell system 10. An electrical valve 36 which is arranged in the second supply line 35 in this case allows the volume flow of the fuel gas that is supplied to be regulated.

The off-gas from the burner 33 which is composed predominantly of water vapour, is then expanded via an expander 25b which is connected to the compressor 25a and is emitted into the environment.

By combustion of the fuel gas reacting with the oxidant, the burner 33 produces a heat flow which is used to preheat the fuel cell 11 and to heat the passenger compartment of the vehicle. For this purpose, the burner 33 is followed by a heat exchanger 40 which is arranged in a tap 41 from the coolant circuit 30, with at least a portion of the coolant circulating in the coolant circuit 30 being tapped off into the tap 41 by closing an electrical valve 42.

A heating heat exchanger 43 in the form of a radiator or the like is provided in order to heat the passenger compartment of the vehicle. The heating heat exchanger 43 is likewise arranged in the tap 41 of the coolant circuit 30, with at least a portion of the combustion heat produced by the burner 33 being transported from the heat exchanger 40 to the heating heat exchanger 43 in the tap 41 during circulation of the coolant.

The heating heat exchanger 43 can be externally heated by the burner 33 after the fuel cell system 10 has been started up, at least until the coolant which is circulating in the coolant circuit 30 has reached its normal operating temperature. The passenger compartment of the vehicle is then heated in the normal manner by means of the radiator 32 by use of the process heat created during operation of the fuel cell 11 and dissipated via the coolant circuit 30. For this purpose, the valve 36 which is provided in order to regulate the fuel gas supplied is closed, and the valve 42 which is arranged in the coolant circuit 30 is opened.

Figure 2:
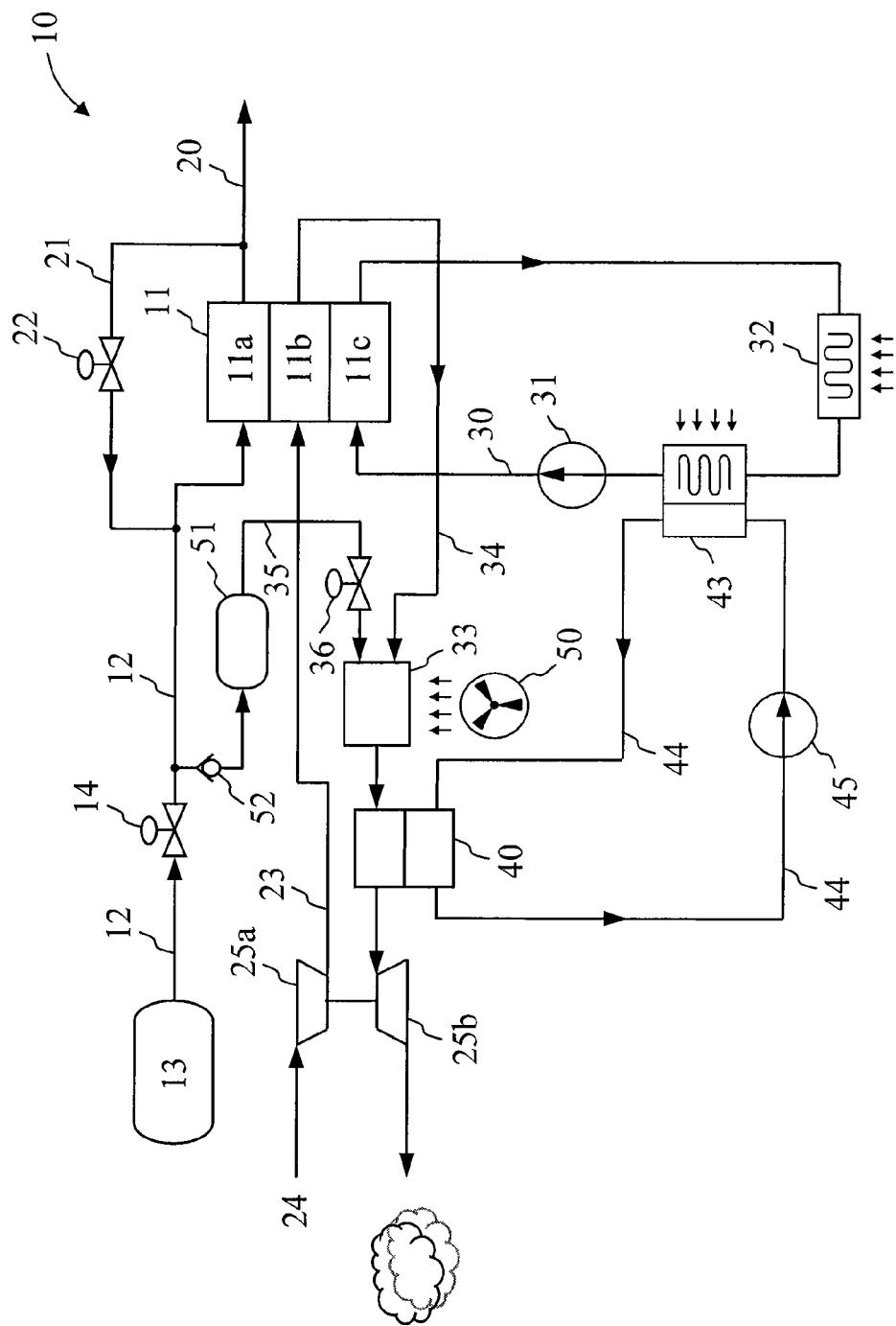
FIG. 2 shows a second exemplary embodiment of the fuel cell system according to the invention.

FIG. 2 shows a second representative embodiment of the fuel cell system 10 according to the invention, which differs from the embodiment illustrated in FIG. 1 in that the heat exchanger 40 which is heated by the burner 33 is connected via its own coolant circuit 44 to the heating heat exchanger 43, with the coolant circuit 44 being operated by means of an associated feed pump 45. In this case, the heating heat exchanger 43 can be heated independently of the operation of the fuel cell 11 and of the coolant circuit 30 associated with the fuel cell 11.

In order to provide such "stationary heating" the burner 33 has its own associated oxidant and/or fuel gas supply. For example, the oxidant supply may be a small electric fan 50, operated by means of a starter battery located in the vehicle. Otherwise, the burner 33 is supplied with the cathode off-gas as an oxidant, which contains oxygen and is created during operation of the fuel cell system 10.

In this context, a reservoir 51 is also provided for the fuel gas supply and is filled with fuel gas from the high-pressure tank or reformer via a non-return valve 52 during operation of the fuel cell system 10, in order to allow continuous supply of fuel gas to the burner 33 after the fuel cell system 10 has been switched off.

Figure 3:
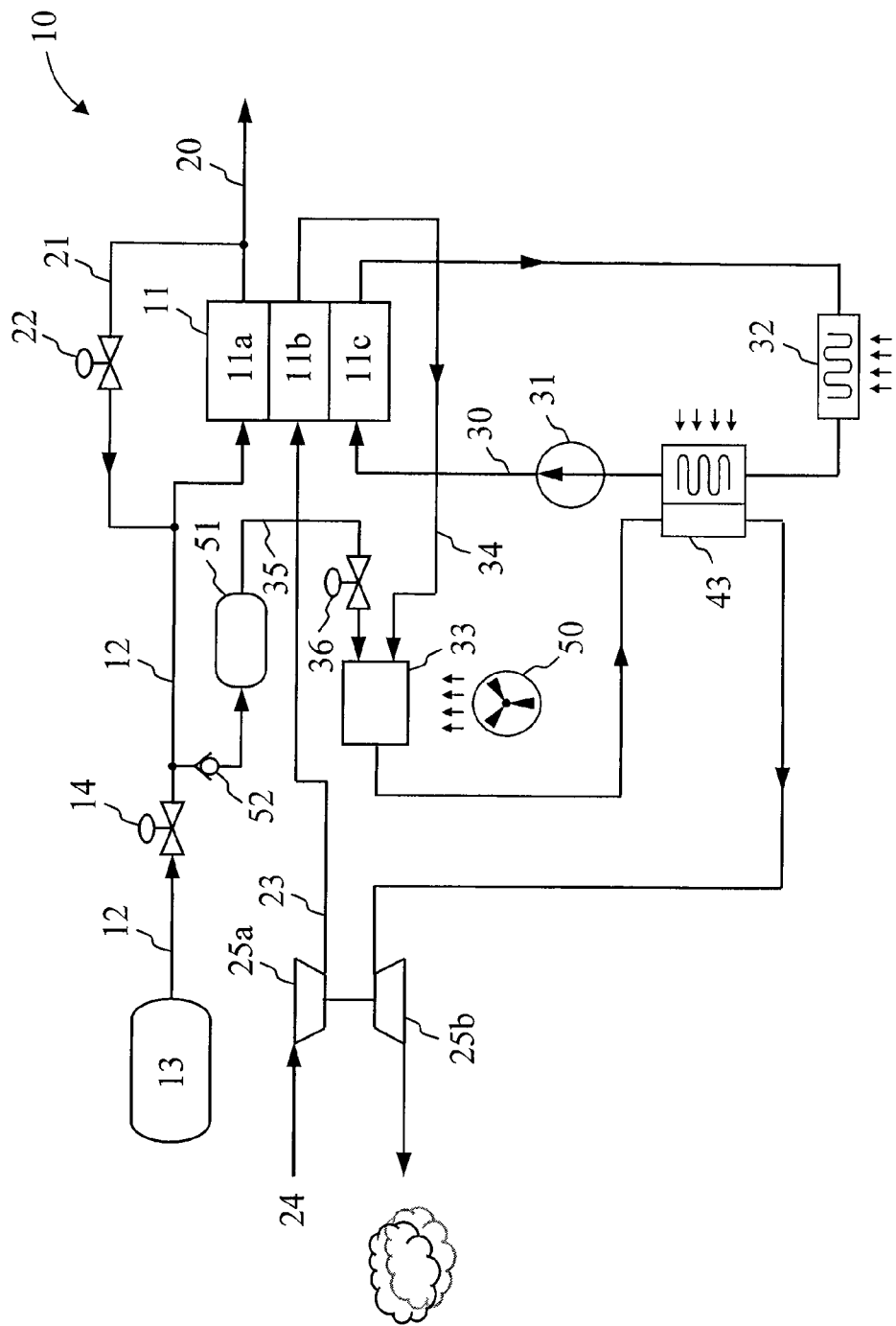
FIG. 3 shows a third exemplary embodiment of the fuel cell system according to the invention.

FIG. 3 shows a third representative embodiment of the fuel cell system 10 according to the invention, which differs from the embodiment illustrated in FIG. 1 only in that the burner 33 is directly connected to the heating heat exchanger 43. This likewise makes it possible to provide stationary heating in the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

| | |
|---|---|
| 10 | Fuel cell system |
| 11 | Fuel cell |
| 11a | Anode area |
| 11b | Cathode area |
| 11c | Cooling device |
| 12 | Supply line |
| 13 | Fuel gas containing Hyrogen |
| 14 | Valve |
| 20 | Off-gas line |
| 21 | Anode return line |
| 22 | Throttle valve |
| 23 | Supply line |

-continued

| | | |
|---|---|---|
| 24 | Oxidant containing oxygen | |
| 25a | Compressor | |
| 25b | Expander | |
| 30 | Coolant circuit | |
| 31 | Feed pump | |
| 32 | Radiator | |
| 33 | Burner | |
| 34 | First supply line | |
| 35 | Second supply line | |
| 36 | Valve | |
| 40 | Heat exchanger | |
| 41 | Tap | |
| 42 | Valve | |
| 43 | Heating heat exchanger | |
| 44 | Coolant circuit | |
| 45 | Feed pump | |
| 50 | Fan | |
| 51 | Reservoir | |
| 52 | Non-return valve | |

The invention claimed is:

1. A vehicle fuel cell system comprising:
a vehicle fuel cell;
a burner configured to produce a heat flow by combustion of a fuel gas which reacts with an oxidant;
a coolant circuit for cooling said vehicle fuel cell;
a heating heat exchanger arranged in said coolant circuit, wherein the heating heat exchanger is configured to provide heat to a vehicle passenger compartment, wherein the heating heat exchanger is externally heated at least at times by means of the burner;
a further coolant circuit,
wherein the coolant circuit and the further coolant circuit are fluidly separate cooling circuits thermally coupled exclusively by the heating heat exchanger,
wherein the burner for heating the heating heat exchanger is connected directly to the heating heat exchanger.

2. The vehicle fuel cell system according to claim 1, wherein the burner has its own associated oxidant supply, which is operable independently of an operating state of the fuel cell system.

3. The vehicle fuel cell system according to claim 2, wherein the oxidant supply is an electrically operated fan.

4. The vehicle fuel cell system according to claim 1, wherein the oxidant comprises air.

5. The vehicle fuel cell system according to claim 1, wherein the oxidant is a cathode off-gas containing oxygen.

6. The vehicle fuel cell system according to claim 1, wherein the fuel gas is one of hydrogen and a gaseous hydrocarbon.

7. The vehicle fuel cell system according to claim 1, wherein the burner is a catalytic burner.

8. The vehicle fuel cell system according to claim 1, wherein the burner is a pore burner.

9. The vehicle fuel cell system according to claim 1, wherein the burner is a flame burner.

10. A vehicle fuel cell system comprising:
a burner configured to produce a heat flow by combustion of a fuel gas which reacts with an oxidant;
a coolant circuit for cooling said vehicle fuel cell system;
a heating heat exchanger arranged in said coolant circuit, wherein the heating heat exchanger is configured to provide heat to a vehicle passenger compartment, wherein the heating heat exchanger is externally heated at least at times by means of the burner;
a radiator arranged in the coolant circuit, the radiator configured to provide heat to the vehicle passenger compartment;
a further coolant circuit fluidly isolated from the coolant circuit;
a further heat exchanger directly coupled to the burner and the heating heat exchanger, wherein the further heat is arranged in the further coolant circuit that is fluidly isolated from the coolant circuit.

11. A vehicle fuel cell system comprising:
a burner configured to produce a heat flow by combustion of a fuel gas which reacts with an oxidant;
a coolant circuit for cooling said vehicle fuel cell system;
a heating heat exchanger arranged in said coolant circuit, wherein the heating heat exchanger is configured to provide heat to a vehicle passenger compartment, wherein the heating heat exchanger is externally heated at least at times by means of the burner;
a radiator arranged in the coolant circuit, the radiator configured to provide heat to the vehicle passenger compartment;
a further coolant circuit; and
a further heat exchanger directly coupled to an output of the burner,
wherein the heating heat exchanger is coupled to the coolant circuit and the further coolant circuit, and
wherein the coolant circuit and the further coolant circuit are fluidly separate cooling circuits thermally coupled exclusively by the heating heat exchanger, and the coolant circuit and further coolant circuit are closed coolant circuits.

12. The vehicle fuel cell system according to claim 10, wherein the burner has its own associated oxidant supply, which is operable independently of an operating state of the fuel cell system and wherein the oxidant supply is an electrically operated fan.

13. The vehicle fuel cell system according to claim 10, wherein the oxidant comprises air.

14. The vehicle fuel cell system according to claim 10, wherein the oxidant is a cathode off-gas containing oxygen.

15. The vehicle fuel cell system according to claim 10, wherein the burner is a catalytic burner, pore burner, or flame burner.

16. The vehicle fuel cell system according to claim 11, wherein the burner has its own associated oxidant supply, which is operable independently of an operating state of the fuel cell system and wherein the oxidant supply is an electrically operated fan.

17. The vehicle fuel cell system according to claim 11, wherein the oxidant comprises air.

18. The vehicle fuel cell system according to claim 11, wherein the oxidant is a cathode off-gas containing oxygen.

19. The vehicle fuel cell system according to claim 11, wherein the burner is a catalytic burner, pore burner, or flame burner.

* * * * *